(12) United States Patent
Bamburg, Jr.

(10) Patent No.: US 8,201,783 B1
(45) Date of Patent: Jun. 19, 2012

(54) POTTED PLANT HOLDER ASSEMBLY

(76) Inventor: David C. Bamburg, Jr., Shreveport, LA (US)

( * ) Notice: Subject to any disclaimer, the term of this patent is extended or adjusted under 35 U.S.C. 154(b) by 0 days.

(21) Appl. No.: 13/317,284

(22) Filed: Oct. 13, 2011

(51) Int. Cl.
*A47G 23/02* (2006.01)

(52) U.S. Cl. ............... 248/150; 47/39; 47/41.14; 47/44; 248/545; 248/27.8; 248/156

(58) Field of Classification Search .................. 248/545, 248/27.8, 121, 146, 149, 150, 156, 159, 530, 248/533; 47/39, 41.14, 44, 47
See application file for complete search history.

(56) References Cited

U.S. PATENT DOCUMENTS

| | | | |
|---|---|---|---|
| 1,369,315 A * | 2/1921 | Ankers | 248/153 |
| 1,609,246 A | 11/1926 | Hamburger | |
| 1,758,839 A * | 5/1930 | Kelsey | 47/47 |
| 2,003,986 A | 6/1935 | Witthuhn | |
| 2,130,961 A * | 9/1938 | Leggett | 211/29 |
| 2,618,902 A * | 11/1952 | Prescott | 47/47 |
| 2,701,701 A * | 2/1955 | Wolff | 248/158 |
| 2,861,764 A | 11/1958 | Fisher | |
| 3,211,404 A | 10/1965 | Edmiston et al. | |
| 3,249,329 A | 5/1966 | Currier | |
| 3,279,733 A * | 10/1966 | Hannan | 248/153 |
| 3,828,373 A * | 8/1974 | Fraley | 4/646 |
| 4,125,965 A | 11/1978 | Schweim | |
| 4,223,859 A | 9/1980 | Erickson | |
| 4,991,344 A * | 2/1991 | Carney | 47/39 |
| 5,037,049 A * | 8/1991 | Funk | 248/165 |
| 5,984,587 A * | 11/1999 | Odle | 405/244 |
| 6,123,311 A * | 9/2000 | Trinier | 248/530 |
| 6,234,444 B1 * | 5/2001 | Haddad | 248/545 |
| 2002/0162274 A1 | 11/2002 | Jaworski | |

* cited by examiner

*Primary Examiner* — Bradley Duckworth
(74) *Attorney, Agent, or Firm* — R. Keith Harrison

(57) ABSTRACT

A potted plant holder assembly includes a bracket holder having a bracket holder housing, a bracket holder base flange carried by the bracket holder housing and a bracket holder cap flange carried by the bracket holder housing in spaced-apart relationship to the bracket holder base flange. A plurality of pot holder brackets is carried by the bracket holder base flange and the bracket holder cap flange of the bracket holder.

17 Claims, 5 Drawing Sheets

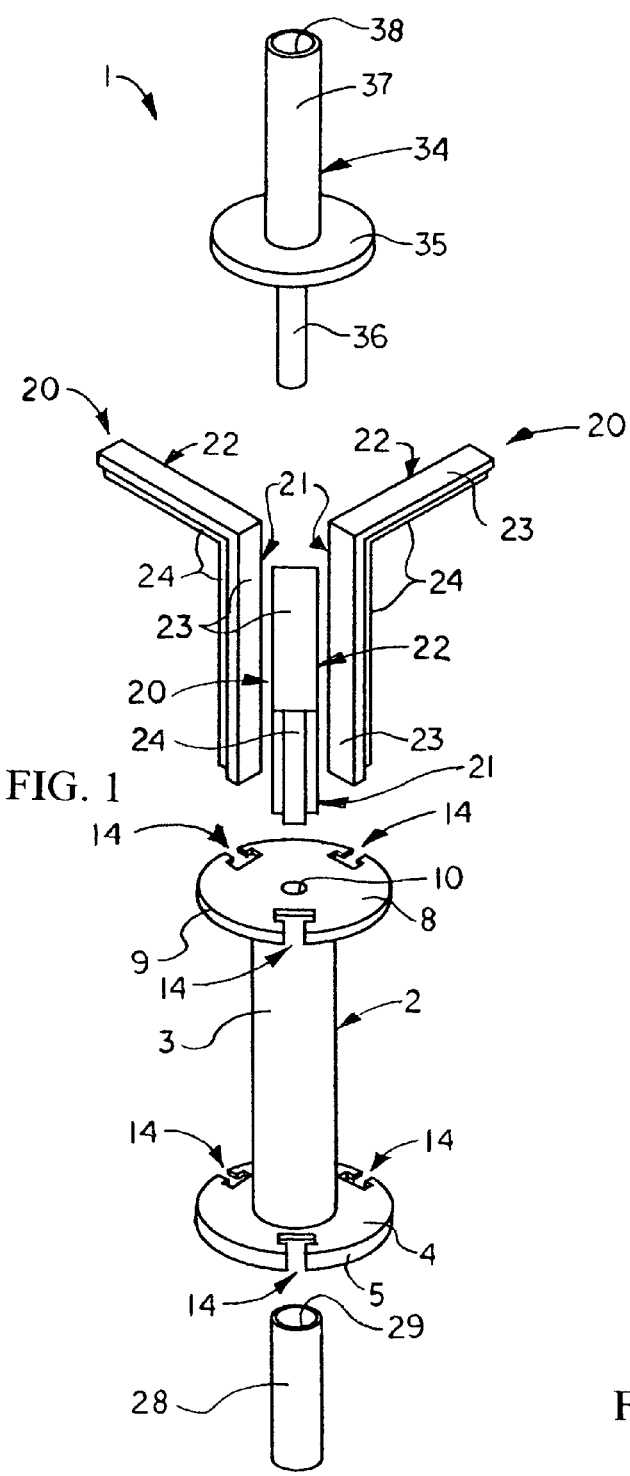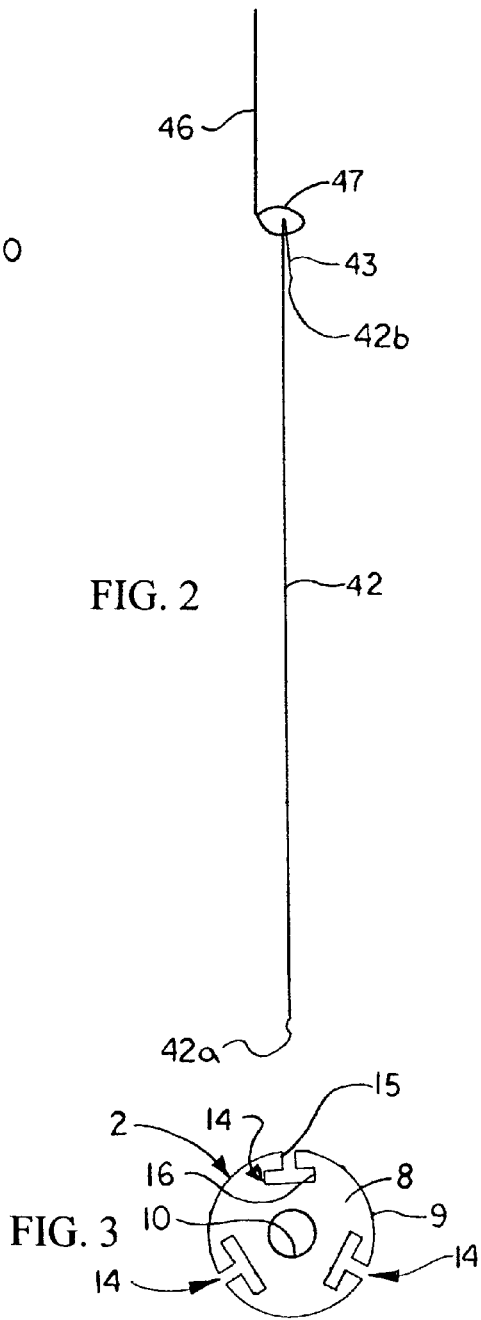
FIG. 1
FIG. 2
FIG. 3

POTTED PLANT HOLDER ASSEMBLY

FIELD

The disclosure generally relates to holders for potted plants. More particularly, the disclosure relates to a potted plant holder assembly which supports a potted plant in an elevated position and eliminates drawbacks of growing plants in a yard, field or greenhouse.

BACKGROUND

Conventional methods of growing plants, particularly vegetable-bearing plants such as tomato plants, in the ground or in a greenhouse have several drawbacks. Growing of plants in a residential setting typically requires that large areas of a yard or field be devoted to the purpose. When the plants are grown outdoors, the ground must be plowed before the seeds are planted. The soil typically must be weeded and grass around the plants may require mowing on a periodic basis. Therefore, conventional methods of growing plants are labor-intensive and space-inefficient.

Therefore, a potted plant holder assembly which supports a potted plant in an elevated position and facilitates growth of vegetable-bearing or other plants without drawbacks of conventional methods for growing such plants is needed.

SUMMARY

The disclosure is generally directed to a potted plant holder assembly. An illustrative embodiment of the potted plant holder assembly includes a bracket holder including a bracket holder housing, a bracket holder base flange carried by the bracket holder housing and a bracket holder cap flange carried by the bracket holder housing in spaced-apart relationship to the bracket holder base flange. A plurality of pot holder brackets is carried by the bracket holder base flange and the bracket holder cap flange of the bracket holder.

BRIEF DESCRIPTION OF THE DRAWINGS

The disclosure will now be made, by way of example, with reference to the accompanying drawings, in which:

FIG. 1 is an exploded perspective view of an illustrative embodiment of the potted plant holder assembly;

FIG. 2 is a side view of an exemplary pot retaining wire and pot retaining hook which are suitable for implementation of an illustrative embodiment of the potted plant holder assembly;

FIG. 3 is a top view of an exemplary bracket holder which is suitable for implementation of an illustrative embodiment of the potted plant holder assembly;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description. Relative terms such as "upper" and "lower" are used for descriptive purposes herein and indicate the positions of the various components of the assembly relative to each other. Thus, such relative terms are not intended to be construed in a limiting sense.

Figure 6:
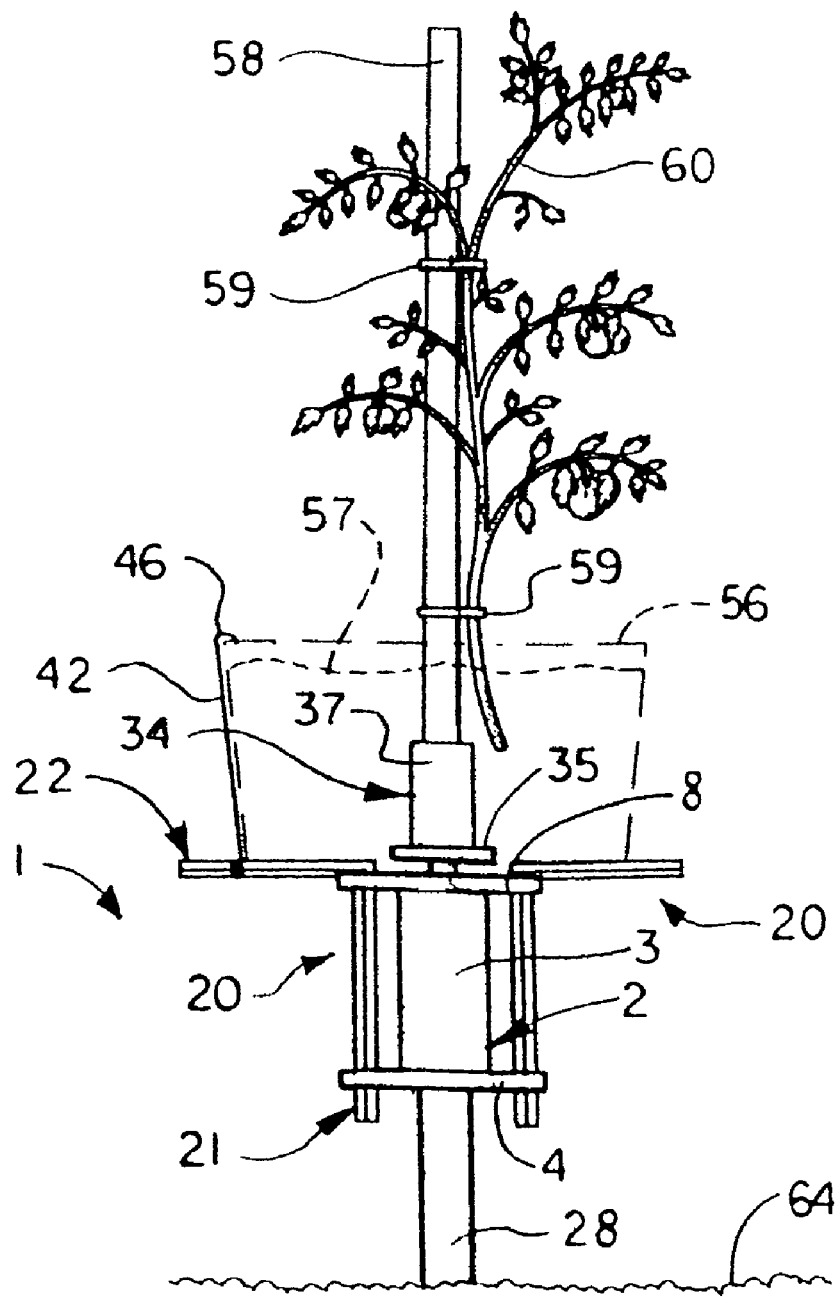
FIG. 6 is a side view of an illustrative embodiment of the potted plant holder assembly, inserted in the ground and supporting a plant pot (in phantom) with a tomato plant growing in the plant pot in exemplary application of the assembly.
Figure 7:
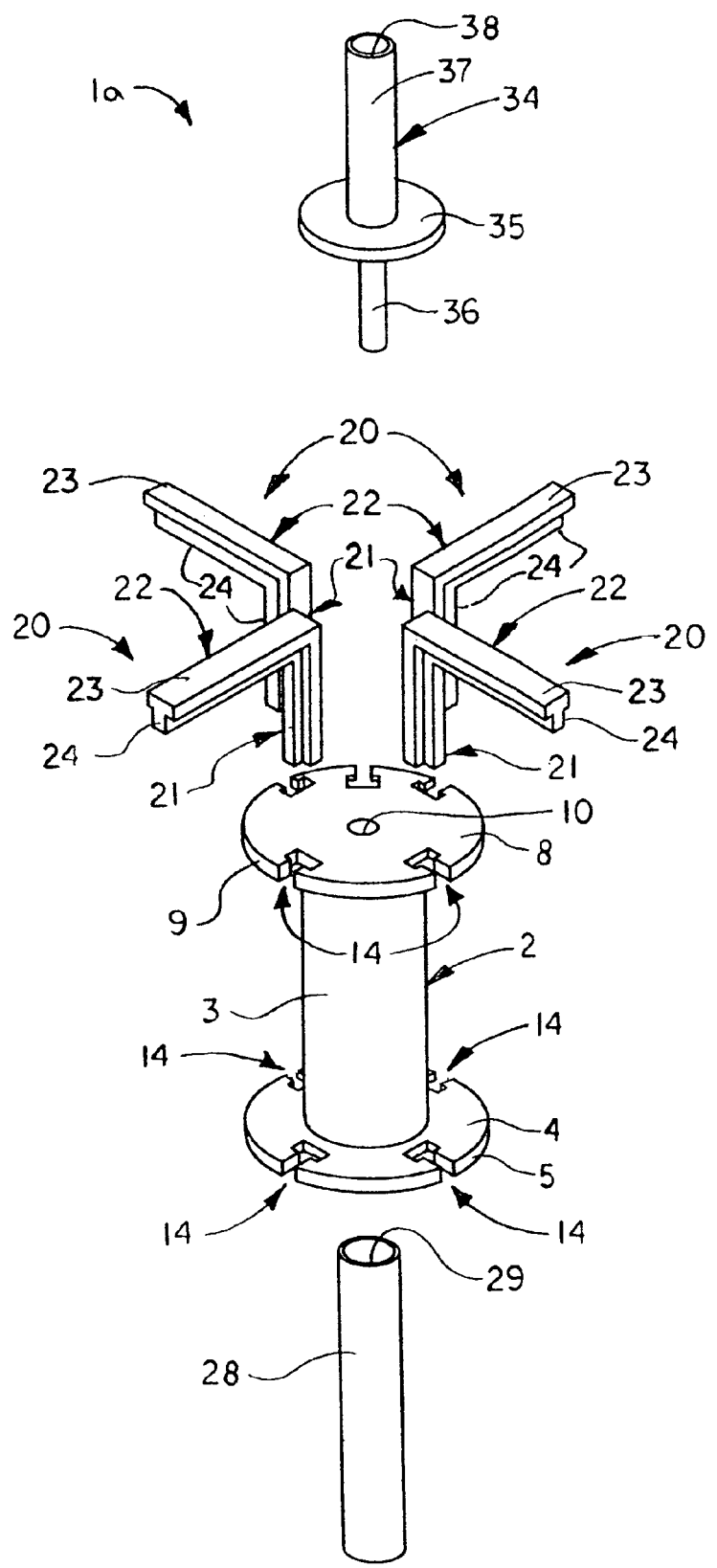
FIG. 7 is an exploded perspective view of an alternative illustrative embodiment of the potted plant holder assembly.

Referring initially to FIG. 6 of the drawings, an illustrative embodiment of the potted plant holder assembly, hereinafter assembly; is generally indicated by reference numeral 1. The assembly 1 may include an upward-standing assembly support shaft 28 the lower end of which may be inserted in the ground 64 typically in a manner which will be hereinafter described. A bracket holder 2 may be supported by the assembly support shaft 28. Multiple pot holder brackets 20 are supported by the bracket holder 2. In exemplary application of the assembly 1, which will be hereinafter described, a plant pot 56 (illustrated in phantom) which contains a supply of soil 57 is placed on and supported by the pot holder brackets 20. At least one plant 60 may be grown in the plant pot 56. In some embodiments, a stake holder 34 may be supported by the bracket holder 2. The stake holder 34 may protrude into the plant pot 56 through a stake holder opening (not illustrated) in the bottom of the plant pot 56. A stake 58 may be supported by the stake holder 34 to support the plant 60 as it grows in the plant pot 56.

Figure 4:
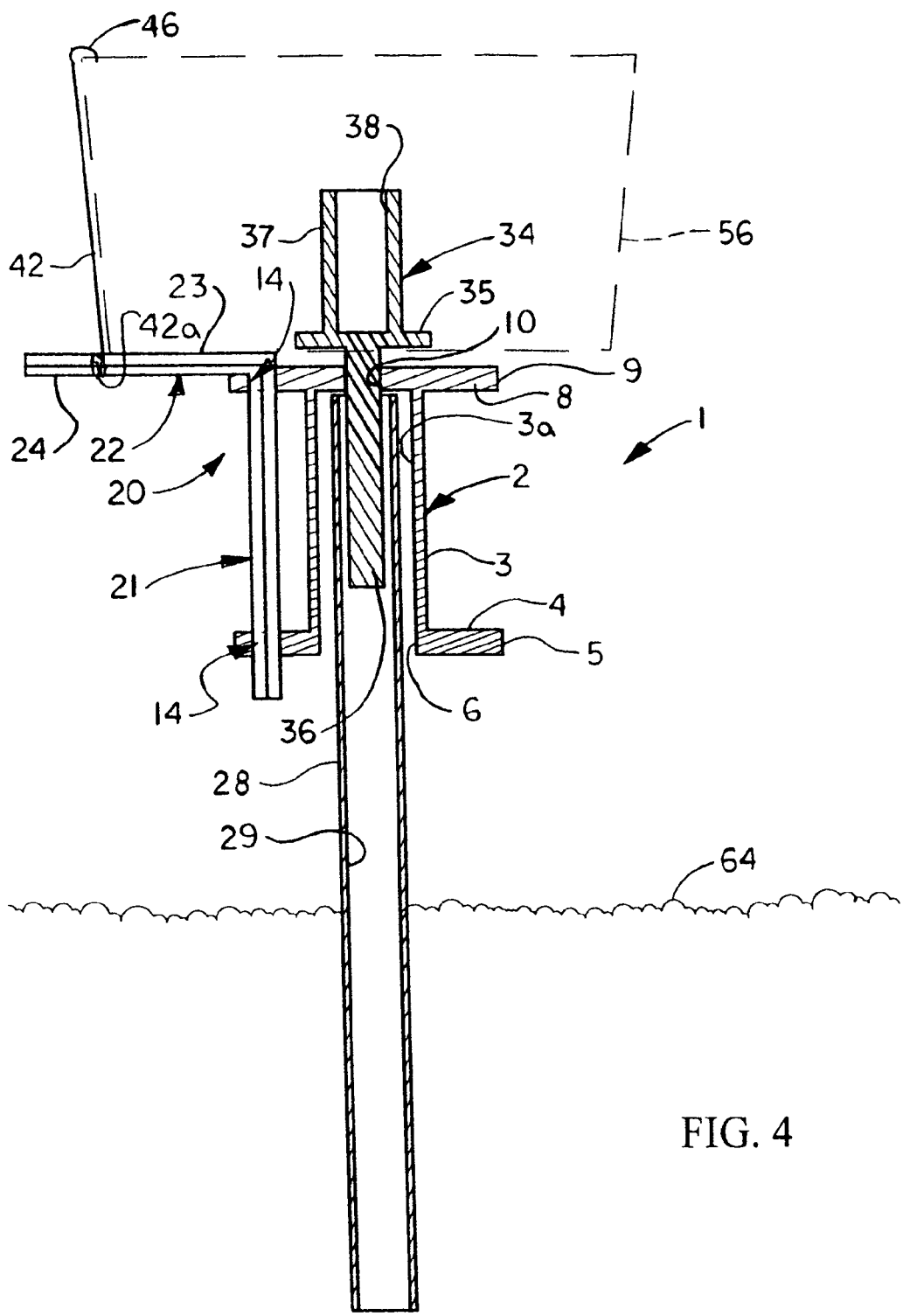
FIG. 4 is a longitudinal sectional view of an assembled potted plant holder assembly, inserted in the ground and supporting a plant pot (in phantom) in exemplary application of the potted plant holder assembly.

Referring next to FIGS. 1-4 and 7 of the drawings, the assembly support shaft 28 of the assembly 1 may have a shaft bore 29. The bracket holder 2 of the assembly 1 may include a bracket holder housing 3 which may be generally elongated and cylindrical. As illustrated in FIG. 4, the bracket holder housing 3 may have a housing interior 3a. A bracket holder base flange 4 may be provided at a lower end of the bracket holder housing 3. The bracket holder base flange 4 may have a base flange edge 5 and a base flange opening 6 which communicates with the housing interior 3a of the bracket holder housing 3, as further illustrated in FIG. 4. The base flange opening 6 of the bracket holder base flange 4 and the housing interior 3a of the bracket holder housing 3 may be sized to receive the upper end of the assembly support shaft 28. A bracket holder cap flange 8 may be provided at an upper end of the bracket holder housing 3. The bracket holder cap, flange 8 may have a cap flange edge 9 and a cap flange opening 10 which communicates with the housing interior 3a of the bracket holder housing 3, as illustrated in FIG. 4. The cap flange opening 10 of the bracket holder cap flange 8 may be smaller in diameter than the assembly support shaft 28. The bracket holder 2 and the assembly support shaft 28 may be metal, plastic, composite material or other material which is suitable for the functional requirements described herein and may be fabricated using conventional casting, molding, machining and/or other fabrication techniques known by those skilled in the art. Moreover, the bracket holder base flange 4 and the bracket holder cap flange 8 may be any shape including but not limited to circular, triangular and square.

The pot holder brackets 20 may be attached to the bracket holder base flange 4 and the bracket holder cap flange 8 using any suitable attachment technique which is known by those skilled in the art. As illustrated in FIGS. 1 and 3, in some embodiments, multiple bracket slots 14 may be provided in each of the bracket holder base flange 4 and the bracket holder cap flange 8. In some embodiments, such as the assembly 1 illustrated in FIG. 1, three bracket slots 14 may be provided in each of the bracket holder base flange 4 and the bracket holder cap flange 8 in equally spaced-apart relationship to each other. In other embodiments, such as the assembly 1a illustrated in FIG. 7, four bracket slots 14 may be provided in each of the bracket holder base flange 4 and the bracket holder cap flange 8. The number of bracket slots 14 in each of the bracket holder base flange 4 and the bracket holder cap flange 8 may correspond to the number of pot holder brackets 20 which are attached to the bracket holder 2. The number of pot holder brackets 20 on the bracket holder 2 may correspond to the size or weight of the plant pot 56 which is to be supported thereon as will be hereinafter further described. It will be recognized and understood that various alternative attachment mechanisms known by those skilled in the art including but not limited to clips and fasteners may be used to attach the pot holder brackets 20 to the bracket holder 2.

The bracket slots 14 in the bracket holder base flange 4 may generally register with the respective bracket slots 14 in the bracket holder cap flange 8. As illustrated in FIG. 3, each bracket slot 14 in the bracket holder cap flange 8 may be generally T-shaped with an edge slot segment 15 which extends from the cap flange edge 9 toward the center of the bracket holder cap flange 8 and a transverse slot segment 16 which communicates with and is generally perpendicular to the edge slot segment 15. Each bracket slot 14 in the bracket holder base flange 4 may have the same or a similar configuration. Accordingly, each pot holder bracket 20 may be attached to the bracket holder base flange 4 and the bracket holder cap flange 8 by inserting each pot holder bracket 20 through a corresponding registering pair of bracket slots 14 in the bracket holder base flange 4 and the bracket holder cap flange 8, respectively.

Each pot holder bracket 20 may be generally L-shaped with a generally elongated long bracket segment 21 and a short bracket segment 22 which extends from the long bracket segment 21 in generally perpendicular relationship thereto. The long bracket segment 21 and the short bracket segment 22 may each have a generally T-shaped cross-section with an elongated, flat bracket body 23 and a bracket flange 24 which extends from one surface of the bracket body 23. Accordingly, as illustrated in FIG. 1, the bracket body 23 of the long bracket segment 21 or the short bracket segment 22 may be sized and configured to extend through the transverse slot segments 16 whereas the bracket flange 24 may be sized and configured to extend through the edge slot segments 15 of the bracket slots 14 in the respective bracket holder base flange 4 and bracket holder cap flange 8. Each pot holder bracket 20 may be metal, plastic, composite material or other material which is suitable for the functional requirements described herein and may be fabricated using conventional casting, molding, machining and/or other fabrication techniques known by those skilled in the art.

Depending on the size of the plant pot 56 which is to be supported on the assembly 1, either the long bracket segments 21 or the short bracket segments 22 of the pot holder brackets 20 support the plant pot 56. Accordingly, as illustrated in FIG. 1, the long bracket segments 21 of the respective pot holder brackets 20 can be inserted through the corresponding pairs of registering bracket slots 14 such that the long bracket segments 21 are oriented generally parallel to the bracket holder housing 3 of the bracket holder 2 and the short bracket segments 22 extend radially outwardly from the bracket holder 2, as illustrated in FIG. 4. This configuration of the pot holder brackets 20 facilitates support of a plant pot 56 having a relatively small size or diameter on the pot holder brackets 20. Conversely, the short bracket segments 22 of the respective pot holder brackets 20 can be inserted through the corresponding pairs of registering bracket slots 14 such that the short bracket segments 22 are oriented generally parallel to the bracket holder housing 3 of the bracket holder 2 and the long bracket segments 21 extend radially outwardly from the bracket holder 2. This configuration of the pot holder brackets 20 facilitates support of a plant pot 56 having a relatively larger size or diameter on the pot holder brackets 20.

In some applications, the plant pot 56 may be secured to the pot holder brackets 20 using any suitable technique which is known by those skilled in the art. As illustrated in FIGS. 2 and 4, in some embodiments, multiple pot retaining wires 42 may be used to attach the plant pot 56 to the respective pot holder brackets 20. As illustrated in FIG. 2, the pot retaining wire 42 may have a first wire end 42a and a second wire end 42b. A wire loop 43 may be formed or shaped in the second wire end 42b. A pot retaining hook 46 may be attached to the wire loop 43 of the pot retaining wire 42 at an attachment loop 47 which is formed or shaped in the pot retaining hook 46. Accordingly, as illustrated in FIG. 4, the first wire end 42a of each pot retaining wire 42 may be wrapped around each corresponding pot holder bracket 20. The pot retaining hook 46 may be extended around the rim of the plant pot 56. Thus, the pot retaining wires 42 secure or retain the plant pot 56 on the pot holder brackets 20 and prevent the plant pot 56 from inadvertently falling from the pot holder brackets 20 due to wind or other influences.

As further illustrated in FIGS. 1 and 4, in some embodiments, a stake holder 34 may be provided on the bracket holder 2 of the assembly 1. The stake holder 34 may include a stake holder base 35. A stake holder insertion pin 36 may extend from a lower surface of the stake holder base 35. A stake receptacle 37 having a stake receptacle interior 38 may extend from an upper surface of the stake holder base 35. Accordingly, as illustrated in FIG. 4, the stake holder 34 may be attached to the bracket holder 2 by inserting the stake holder insertion pin 36 through the cap flange opening 10 in the bracket holder cap flange 8 and into the housing interior 3a of the bracket holder housing 3. As illustrated in FIG. 6, a stake 58 may be inserted in the stake holder receptacle interior 38 (FIG. 4) of the stake receptacle 37 to support a plant 60 as it grows in the plant pot 56 as will be hereinafter described. The stake holder 34 may be metal, plastic, composite material or other material which is suitable for the functional requirements described herein and may be fabricated using conventional casting, molding, machining and/or other fabrication techniques known by those skilled in the art.

Figure 5:
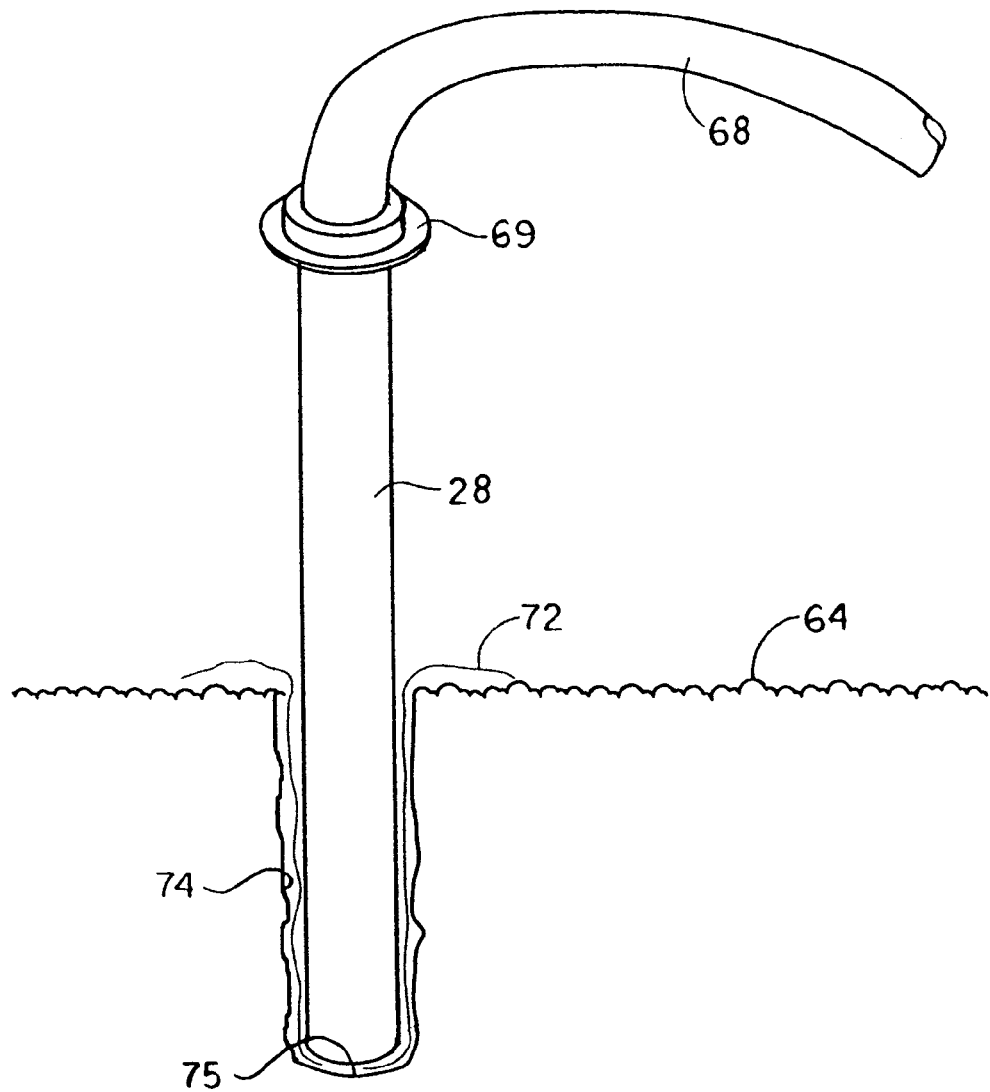
FIG. 5 is a perspective view which illustrates an exemplary method or technique of inserting an assembly support shaft of the potted plant holder assembly in the ground to support the potted plant holder assembly in exemplary application of the assembly.

Referring next to FIGS. 4-6 of the drawings, in exemplary application of the assembly 1, the assembly support shaft 28 is partially inserted in the ground 64. As illustrated in FIG. 5, in some applications, a water hose 68 which is connected to a faucet or other water source (not illustrated) may be coupled to the upper end of the assembly support shaft 28 using an adaptor 69 which is suitable for the purpose. Water (not illustrated) flows through the water hose 68 and the shaft bore 29 (FIG. 4) of the assembly support shaft 28, respectively, and is discharged from the lower end of the assembly support shaft 28 at the bottom 75 of an opening 74 in the ground 64 in which the lower end of the assembly support shaft 28 is inserted. A soil/water mixture 72 flows up through the opening 74 as the assembly support shaft 28 sets progressively deeper into the opening 74 until the desired length of the assembly support shaft 28 extends into the ground 64. At that point, the supply of water to the assembly support shaft 28 is turned off and the water hose 68 is uncoupled from the assembly support shaft 28 at the adaptor 69.

As illustrated in FIGS. 1 and 4, the pot holder brackets 20 are attached to the bracket holder 2 typically by inserting the long bracket segments 21 (as illustrated) or the short bracket segments 22 through the registering bracket slots 14 in the bracket holder cap flange 8 and the bracket holder base flange 4, respectively. As illustrated in FIG. 4, in applications in which the plant pot 56 is relatively small in size or diameter, the long bracket segment 21 of each pot holder bracket 20 may be inserted through the registering bracket slots 14, leaving the horizontal, outwardly-extending short bracket segments 22 exposed to support the plant pot 56. As illustrated in FIGS. 4 and 6, the plant pot 56 is placed on the short bracket segments 22 of the respective pot holder brackets 20. In applications in which the plant pot 56 is relatively large in size or diameter, the short bracket segment 22 of each pot holder bracket 20 may be inserted through the registering bracket slots 14, leaving the horizontal, outwardly-extending long bracket segments 21 exposed to support the plant pot 56. It will be appreciated by those skilled in the art that in some embodiments the pot holder brackets 20 can be selectively and detachably removed from the bracket slots 14, inverted and re-inserted in the bracket slots 14 to re-orient the pot holder brackets 20 on the bracket holder 2 such that either the long bracket segments 21 or the short bracket segments 22 provide the support for the plant pot 56.

As illustrated in FIG. 4, the bracket holder 2 is lowered in placed on the assembly support shaft 28 as the upper end of the assembly support shaft 28 extends through the base flange opening 6 in the bracket holder base flange 4 and into the housing interior 3a of the bracket holder housing 3. The lower surface of the bracket holder cap flange 8 rests on the upper end of the assembly support shaft 28. The plant pot 56 may then be placed on the pot holder brackets 20. The plant pot 56 may be secured to the pot holder brackets 20 using any suitable technique known by those skilled in the art. In some embodiments, multiple pot retaining wires 42 may secure the plant pot 56 to the pot holder brackets 20 as was heretofore described with respect to FIGS. 1 and 4. Soil 57 (FIG. 6) may be placed in the plant pot 56 and one or more plants 60 grown in the soil 57. The soil 57 may be periodically watered by discharging water (not illustrated) into the soil 57 from a water hose (not illustrated) or by pouring the water from a suitable container (not illustrated).

As further illustrated in FIGS. 1, 4 and 6, in some embodiments, the stake holder 34 may be fitted on the bracket holder 2. Accordingly, the stake holder insertion pin 36 is inserted through an opening (not illustrated) in the bottom of the plant pot 56 and through the registering cap flange opening 10 in the cap flange 8 of the bracket holder 2. The lower end of a stake 58 is inserted in the stake holder interior 38 (FIG. 4) of the stake receptacle 37. The plant 60, which in some applications may be a tomato plant, may be attached to the stake 58 using one or multiple clamps 59. Accordingly, the stake 58 supports the plant 60 as the plant 60 grows from the soil 57 in the plant pot 56.

While various illustrative embodiments have been described above, it will be recognized and understood that various modifications can be made and the appended claims are intended to cover all such modifications which may fall within the spirit and scope of the disclosure.

What is claimed is:

1. A potted plant holder assembly, comprising:
    a bracket holder including:
        a bracket holder housing;
        bracket holder base flange carried by said bracket holder housing;
        a first plurality of generally T-shaped bracket slots extending completely through a thickness of said bracket holder base flange;
        a bracket holder cap flange carried by said bracket holder housing in spaced-apart relationship to said bracket holder base flange; and
        a second plurality of generally T-shaped bracket slots extending completely through a thickness of said bracket holder cap flange and disposed in registering relationship to said first plurality of generally T-shaped bracket slots, respectively; and
    a plurality of pot holder brackets carried by said bracket holder base flange and said bracket holder cap flange of said bracket holder, each of said plurality of pot holder brackets having a generally T-shaped cross-section and adapted for insertion through a corresponding pair of said first plurality of T-shaped bracket slots and said second plurality of generally T-shaped bracket slots.

2. The assembly of claim 1 wherein said bracket holder housing is generally elongated and cylindrical and said bracket holder base flange and said bracket holder cap flange are carried by opposite ends of said bracket holder housing.

3. The assembly of claim 1 further comprising an assembly support shaft and wherein said bracket holder is carried by said assembly support shaft.

4. The assembly of claim 3 wherein said bracket holder housing has a housing interior and said bracket holder base flange has a base flange opening communicating with said housing interior and said housing interior and said base flange opening accommodate said assembly support shaft.

5. The assembly of claim 1 wherein each of said plurality of bracket slots comprises an edge slot segment and a transverse slot segment communicating with said edge slot segment.

6. The assembly of claim 5 wherein each of said plurality of pot holder brackets comprises a bracket body adapted for insertion through said transverse slot segment and a bracket flange carried by said bracket body and adapted for insertion through said edge slot segment of a corresponding one of said plurality of bracket slots.

7. The assembly of claim 1 wherein each of said plurality of pot holder brackets comprises a first bracket segment having a first length and a second bracket segment carried by said first bracket segment and having a second length less than said first length, each of said plurality of pot holder brackets selectively mountable in a first position on said bracket holder housing wherein said first bracket segment extends outwardly from said bracket holder housing and a second position on said bracket holder housing wherein said second bracket segment extends outwardly from said bracket holder housing.

8. A potted plant holder assembly, comprising:
    a bracket holder including:
        a bracket holder housing;
        bracket holder base flange carried by said bracket holder housing;
        a first plurality of generally T-shaped bracket slots extending completely through a thickness of said bracket holder base flange;
        a bracket holder cap flange carried by said bracket holder housing in spaced-apart relationship to said bracket holder base flange; and
        a second plurality of generally T-shaped bracket slots extending completely through a thickness of said bracket holder cap flange and disposed in registering relationship to said first plurality of generally T-shaped bracket slots, respectively;

a plurality of generally L-shaped pot holder brackets carried by said bracket holder base flange and said bracket holder cap flange of said bracket holder, each of said plurality of pot holder brackets having a generally T-shaped cross-section and adapted for insertion through a corresponding pair of said first plurality of T-shaped bracket slots and said second plurality of generally T-shaped bracket slots; and a stake holder having a stake receptacle with a stake receptacle interior carried by said bracket holder housing of said bracket holder.

9. The assembly of claim 8 wherein said bracket holder housing is generally elongated and cylindrical and said bracket holder base flange and said bracket holder cap flange are carried by opposite ends of said bracket holder housing.

10. The assembly of claim 8 further comprising an assembly support shaft and wherein said bracket holder is carried by said assembly support shaft.

11. The assembly of claim 10 wherein said bracket holder housing has a housing interior and said bracket holder base flange has a base flange opening communicating with said housing interior and said housing interior and said base flange opening receive said assembly support shaft.

12. The assembly of claim 8 wherein each of said plurality of bracket slots comprises an edge slot segment and a transverse slot segment communicating with said edge slot segment.

13. The assembly of claim 12 wherein each of said plurality of pot holder brackets comprises a bracket body adapted for insertion through said transverse slot segment and a bracket flange carried by said bracket body and adapted for insertion through said edge slot segment of a corresponding one of said plurality of bracket slots.

14. The assembly of claim 8 wherein each of said plurality of pot holder brackets comprises a first bracket segment having a first length and a second bracket segment carried by said first bracket segment and having a second length less than said first length, each of said plurality of pot holder brackets selectively mountable in a first position on said bracket holder housing wherein said first bracket segment extends outwardly from said bracket holder housing and a second position on said bracket holder housing wherein said second bracket segment extends outwardly from said bracket holder housing.

15. A potted plant holder assembly, comprising:
an assembly support shaft;
a bracket holder including:
    a bracket holder housing having a housing interior;
    bracket holder base flange carried by said bracket holder housing and having a base flange opening communicating with said housing interior of said bracket holder housing, said housing interior of said bracket holder housing and said base flange opening of said bracket holder base flange accommodating said assembly support shaft;
    a first plurality of generally T-shaped bracket slots extending completely through a thickness of said bracket holder base flange;
    a bracket holder cap flange carried by said bracket holder housing in spaced-apart relationship to said bracket holder base flange; and
    a second plurality of generally T-shaped bracket slots extending completely through a thickness of said bracket holder cap flange and disposed in registering relationship to said first plurality of generally T-shaped bracket slots respectively;

a plurality of generally L-shaped pot holder brackets carried by said bracket holder base flange and said bracket holder cap flange of said bracket holder, each of said plurality of pot holder brackets having a generally T-shaped cross-section and adapted for insertion through a corresponding pair of said first plurality of T-shaped bracket slots and said second plurality of generally T-shaped bracket slots;

each of said plurality of pot holder brackets including a first bracket segment having a first length and a second bracket segment carried by said first bracket segment and having a second length less than said first length, each of said plurality of pot holder brackets selectively and detachably mountable in a first position on said bracket holder housing wherein said first bracket segment extends outwardly from said bracket holder housing and a second position on said bracket holder housing wherein said second bracket segment extends outwardly from said bracket holder housing;

a plurality of pot retaining wires carried by said plurality of pot holder brackets, respectively;

a plurality of pot retaining hooks carried by said plurality of pot retaining wires, respectively; and a stake holder having a stake receptacle with a stake receptacle interior carried by said bracket holder housing of said bracket holder.

16. The assembly of claim 15 wherein each of said plurality of bracket slots comprises an edge slot segment and a transverse slot segment communicating with said edge slot segment.

17. The assembly of claim 16 wherein each of said plurality of pot holder brackets comprises a bracket body adapted for insertion through said transverse slot segment and a bracket flange carried by said bracket body and adapted for insertion through said edge slot segment of a corresponding one of said plurality of bracket slots.

* * * * *